United States Patent Office
3,041,339
Patented June 26, 1962

3,041,339
1-[PYRIMIDINYL-(2)] GUANAZOLE COMPOUNDS
Kenzo Sirakawa, Nishinomiya, Hyogo, Teruaki Tsujikawa, Otsu, Shiga, and Takashi Tsuda, Higashiyodogawa-ku, Osaka, Japan, assignors to Takeda Chemical Industries, Ltd., Osaka, Japan
No Drawing. Filed July 28, 1961, Ser. No. 127,509
Claims priority, application Japan July 30, 1960
10 Claims. (Cl. 260—256.4)

This invention relates to novel compounds useful as medicines for the therapy of hypertension. More particularly, the invention has a specific relation to new pyrimidinylguanazole compounds of the Formula I, some of which have characteristic effects in lowering blood pressure, and to the preparation of those compounds:

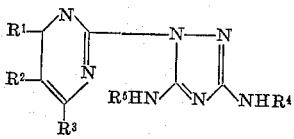

(I)

wherein each $R^1$ and $R^3$ stands for hydrogen, an alkyl or an alkoxyl group; $R^2$ stands for hydrogen, a halogen, an alkyl or an alkoxyl group; and each of $R^4$ and $R^5$ stands for hydrogen, an alkyl, an aryl or a carboxylic acid acyl group.

In bodies of animals including human beings, a constriction of local blood vessels results in diminishing flow-rate of blood, and if the constriction is continued for some period it gives rise to oxygen and alimentary deficiency or necrosis at the part where the constriction occurs. While if tension of peripheral arterioles is elevated all over the body, there occurs so-called hypertension (hypertonia) in the body and it gives rise to various hindrances for the normal physiological function of the body, for example, headache, cardiac failure, or disturbance of circulation, and most dangerous of all, sudden death by cerebral vascular accident.

Hypertension is thought to be provoked by such factors as central nervous factor, autonomic nervous factor, renal factor, etc., and the respective medicaments affecting these factors have been known and used. However, no medicament has been known that directly affects the peripheral vessels to allow them to dilate without any effect on the central or the autonomic nervous system.

On the other hand, the compounds of the present invention, represented by 1-[pyrimidinyl-(2)]guanazole, have the following characteristic properties as medicines against hypertension: namely, they cause a gradual and sustained hypotensive effect due to a direct peripheral vasodilation when administered to laboratory animals. As the compounds have no direct influence on the nervous systems and possess a desirable oral efficacy and also are capable of dilating the coronary blood vessels, they may be safely and conveniently used for hypertensive patients without causing sudden fall of blood pressure.

It is the object of the present invention to provide novel compounds of the Formula I, which have the above-mentioned characteristic effects as medicines for hypertension. They may be administered orally or by injection.

Another object of the invention is to provide means for producing the new compounds of the Formula I.

To realize the second object of the invention, a condensation reaction is effected between the starting materials selected from the following combinations of compounds:

(1) A compound representable by the Formula II

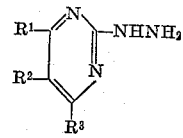

(II)

where $R^1$, $R^2$ and $R^3$ are of the same meanings as in Formula I, and a compound representable by

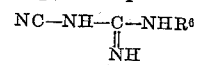

(III)

where $R^6$ is hydrogen, a lower alkyl and an aryl; or
(2) A compound representable by the Formula IV

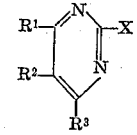

(IV)

where $R^1$, $R^2$ and $R^3$ are of the same meanings as in Formula I and X is a halogen, and a compound representable by the Formula V

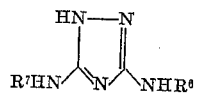

(V)

where $R^6$ is of the same meanings as mentioned above and $R^7$ is hydrogen, a lower alkyl and an aryl; or
(3) A compound representable by the Formula VI

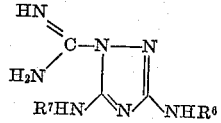

where $R^6$ and $R^7$ are of the same meanings as mentioned above, and a compound selected from the group consisting of

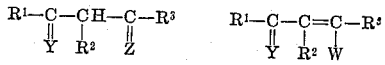

and

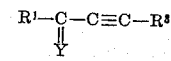

where $R^1$, $R^2$ and $R^3$ are of the same meanings as in Formula I, each of Y and Z is a member selected from the group consisting of =O, =NH, two halogen atoms, two lower alkoxyls and both a halogen atom and a lower alkoxyl, and W is a member selected from the group consisting of hydroxyl and a lower alkoxyl.

By the condensation reactions there can be produced the desired pyrimidinylguanazoles such as 1-[pyrimidinyl-(2)]guanazole,
1-[pyrimidinyl-(2)]-3-amino-5-methylamino-(1,2,4)-triazole,
1-[pyrimidinyl-(2)]-3-amino-5-ethylamino-(1,2,4)-triazole,
1-[pyrimidinyl-(2)]-3-amino-5-isopropylamino-(1,2,4)-triazole,
1-[pyrimidinyl-(2)]-3-amino-5-butylamino-(1,2,4)-triazole,
1-[pyrimidinyl-(2)]-3-amino-5-propylamino-(1,2,4)-triazole,
1-[4-methylpyrimidinyl-(2)]guanazole, 1-[4-methylpyrimidinyl-(2)]-3-amino-5-methylamino-(1,2,4)-triazole,
1-[4-methylpyrimidinyl-(2)]-3-amino-5-ethylamino-(1,2,4)-triazole,
1-[4-methylpyrimidinyl-(2)]-3-amino-5-isopropylamino-(1,2,4)-triazole,
1-[4-methylpyrimidinyl-(2)]-3-amino-5-butylamino-(1,2,4)-triazole,
1-[4,6-dimethylpyrimidinyl-(2)]guanazole,
1-[4,6-dimethylpyrimidinyl-(2)]-3-amino-5-methylamino-(1,2,4)-triazole,
1[4,6-dimethylpyrimidinyl-(2)]-3-amino-5-ethylamino-(1,2,4)-triazole,
1-[4,6-dimethylpyrimidinyl-(2)]-3-amino-5-butylamino-(1,2,4)-triazole,
1-[5-bromopyrimidinyl-(2)]guanazole,
1-[5-bromopyrimidinyl-(2)]-3-amino-5-methylamino-(1,2,4)-triazole,
1-[5-bromopyrimidinyl-(2)]-3-amino-5-ethylamino-(1,2,4)-triazole,
1-[5-bromopyrimidinyl-(2)]-3-amino-5-isopropylamino-(1,2,4)-triazole,
1-[5-bromopyrimidinyl-(2)]-3-amino-5-butylamino-(1,2,4)-triazole,
1-[5-chloropyrimidinyl-(2)]guanazole,
1-[pyrimidinyl-(2)]-3-amino-5-anilino-(1,2,4)-triazole,
1-[4-methylpyrimidinyl-(2)]-3-amino-5-anilino-(1,2,4)-triazole,
1-[4,6-dimethylpyrimidinyl-(2)]-3-amino-5-anilino-(1,2,4)-triazole,
1-[pyrimidinyl-(2)]-3-anilino-5-amino-(1,2,4)-triazole,
1-[pyrimidinyl-(2)]-3-p-methoxyanilino-5-amino-(1,2,4)-triazole,
1-[pyrimidinyl-(2)]-3-p-ethoxyanilino-5-amino-(1,2,4)-triazole,
1-[pyrimidinyl-(2)]-3-o-methoxyanilino-5-amino-(1,2,4)-triazole,
1-[pyrimidinyl-(2)]-3,5-dianilino-(1,2,4)-triazole,
1-[pyrimidinyl-(2)]-3-p-chloroanilino-5-methylamino-(1,2,4)-triazole,
1-[pyrimidinyl-(2)]-3-p-chloroanilino-5-ethylamino-(1,2,4)-triazole,
1-[pyrimidinyl-(2)]-3-p-chloroanilino-5-isopropylamino-(1,2,4)-triazole,
1-[pyrimidinyl-(2)]-3-p-chloroanilino-5-butylamino-(1,2,4)-triazole,
1-[4-methylpyrimidinyl-(2)]-3-p-chloroanilino-5-methylamino-(1,2,4)-triazole,
1-[4-methylpyrimidinyl-(2)]-3-p-chloroanilino-5-ethylamino-(1,2,4)-triazole,
1-[4-methylpyrimidinyl-(2)]-3-p-chloroanilino-5-isopropylamino-(1,24)-triazole,
1-[4-methylpyrimidinyl-(2)]-3-p-chloroanilino-5-butylamino-(1,2,4)-triazole,
1-[4-methylpyrimidinyl-(2)]-3-anilino-5-amino-(1,2,4)-triazole,
1-[4,6-dimethylpyrimidinyl-(2)]-3-anilino-5-amino-(1,2,4)-triazole, etc.

The mechanism of the reaction between the compound (II) and the compound (III) apparently is such that the hydrazino group of the hydrazinopyrimidines (II) may react with the cyano group of dicyandiamide or its N-substituted derivatives (III) to form intermediates temporarily in a form of biguanides, and then one mole of ammonia may be eliminated from the intermediates which, at the same time, may intramolecularly form the guanazole ring to give the objective pyrimidinylguanazoles (I).

The hydrazinopyrimidines (I) as the starting material may be in a form of salt formed with an inorganic or organic acid as mentioned below. The reaction proceeds more smoothly in the presence of a suitable acid substance, for example, an inorganic acid such as hydrochloric acid, hydrobromic acid, sulfuric acid, nitric acid, phosphoric acid, etc., a sulfonic acid such as methane- sulfonic acid, ethanesulfonic acid, ethanedisulfonic acid, propanesulfonic acid, toluenesulfonic acid, benezenesulfonic acid, etc., may generally be used. However, when the starting hydrazinopyrimidines are used in the form of a salt with such an acid as enumerated above, it is unnecessary to further add such an acid as the catalyst and the reaction proceeds smoothly even without addition of any acid substance.

It is desirable that this reaction is effected in a suitable solvent. As the solvent, for example, water, a lower aliphatic alcohol such as methanol, ethanol, etc., an ether such as dioxane, tetrahydrofuran, etc., a tertiary amine such as pyridine, trimethylamine, etc., or a mixture of two or more kinds of them may usually be employed. The solvent to be used for the reaction is not necessarily the one capable of fully dissolving the starting materials, but it may be selected from those giving no hindrance to the objective reaction. In most cases, these reactions are preferably effected by heating the reaction mixture for several hours at a temperature of from 60 to 130° C., preferably around 100° C. It is, however, not wise to be bound to a temperature around 100° C., because the reaction may sometimes be favorably carried out at a temperature fairly lower or higher than 100° C.

The objective compounds (I) may also be synthesized by the condensation reaction in which a 2-halopyrimidine compound (IV) is allowed to react with guanazole compound (V).

This reaction is also effected usually in a solvent. As the solvent, for example, water, such a lower alcohol as methyl alcohol, ethyl alcohol, butyl alcohol, etc., such a ketone as acetone, methyl ethyl ketone, etc., such an ether as dioxane, tetrahydrofuran, etc., such an acetic acid ester as ethyl acetate, methyl acetate, etc., such a basic solvent as pyridine, picoline, collidine, triethylamine, dimethylformamide, etc., and such an aromatic solvent as benzene, toluene, chlorobenzene, etc., or a mixture of two or more kinds of them may be employed.

In this reaction, too, it is not necessary for the solvent to be able to fully dissolve the starting materials, and the solvent may be selected from those giving no hindrance to the said reaction.

The reaction may be accelerated in the presence of a basic substance and, as the basic substance, for example, an inorganic alkaline substance such as an alkali metal hydroxide, an alkali metal carbonate, an alkali metal hydrogen carbonate, ammonia, ammonium carbonate, etc., such a tertiary amine as pyridine, collidine, picoline, trimethyl amine, triethyl amine, dimethylformamide, etc. or such a basic anion exchange resin as Amberlite IRA–400 (produced by Rohm & Haas Co., U.S.A.), Amberlite IRA–410 (produced by Rohm & Haas Co., U.S.A.), De-Acidite FF (produced by The Permutit Co., London, England), Dowex 1 (produced by Dow Chemical Co., U.S.A.), Dowex 2 (produced by Dow Chemical Co., U.S.A.), Duolite 42 (produced by Chemical Process Co., U.S.A.), etc. may favorably be utilized. When the basic substance, especially in a state of liquid, is employed as the solvent for the reaction, it is of course unnecessary to further add any basic substance as a reaction accelerator.

It may also be possible to cause an acid substance to catalyze the reaction. As the acid substance, for example, such a mineral acid as hydrochloric acid, hydrobromic acid, sulfuric acid, nitric acid, phosphoric acid, etc., such an organic sulfonic acid as methane sulfonic acid, benzene sulfonic acid, toluene sulfonic acid, etc., or such a cation-exchange resin as Amberlite IR–120 (Rohm & Haas Co., U.S.A.), Chempro C–20 (Chemical Process Co., U.S.A.), Dowex 50 (Dow Chemical Co., U.S.A.), Permutit Q (Permutit A.G., Germany), Zeo-Karb 225 (The Permutit Co., England), etc. may be employed.

Some of the compounds (I) may also be synthesized by allowing a 1-guanylguanazole of the Formula VI to react with such a 1,3-bis-functionated compound as acetylacetone, propargylaldehyde, 1,1,3,3-tetraethoxypropane, 1-acetyl-2,2-diethoxypropane, 1 acetyl-2-iminopropane, 1-acetyl-2,2-dichloropropane, 1-acetyl-2-hydroxyprop-1-ene, 2-acetyl-3-ethoxybut-2-ene, 1-acetyl-2-propoxyprop-1-ene, 1,1,3 - trichloro-3-methoxypropane, 2,4,4-triethoxypent-2-ene, acetylacetylene, 1-acetylprop-1-ine, 2,2-diethoxypent-3 - ine, 2 - iminopent-3-ine, 2,2-dichloropent-3-ine, etc., whereupon a condensation between both compounds is effected to form a pyrimidine-ring. The reaction is usually effected in such a solvent as water, methylalcohol, ethylalcohol, dioxane, benzene, toluene, a mixture thereof, etc. In most cases, the reaction may be accelerated by the addition of such a strong acid as hydrochloric acid, hydrobromic acid, sulfuric acid, nitric acid, methanesulfonic acid, benzenesulfonic acid, toluenesulfonic acid, etc.

Heating of the reaction mixture is usually unnecessary to effect the reaction. If there is a fear that the bond between the nitrogen atom in the 1,2-4-triazole-ring and the carbon atom of the guanyl group may be hydrolyzed in the reaction mixture, the reaction mixture may be cooled during the reaction, at least for a while just after the start of the reaction.

When the product of the above-mentioned condensation reactions is unsubstituted at the 3- and/or 5-amino groups in the guanazole moiety, in other words, when $R^4$ and/or $R^5$ of the product are hydrogen, the product may further be acylated, if desired, in a usual manner for acylation, for example, with chlorides, bromides or anhydrides of the carboxylic acid corresponding to the acyl group desired to be introduced into the amino group or groups. The carboxylic acid is usually such an aliphatic or an arylaliphatic carboxylic acid as acetic acid, formic acid, propionic acid, butyric acid, succinic acid, pimeric acid, monochloroacetic acid, phenylacetic acid, etc. The acid halides or the acid anhydrides may be used as usual together with such a base as an alkali metal hydroxide, an alkali metal carbonate, an alkali metal hydrogen carbonate, ammonia, pyridine, picoline, dimethylformamide, etc.

These products which are fairly strong bases and capable of forming salts with a variety of acids, may be allowed to form the corresponding salts by neutralization with a strong acid as desired, for example, with such an inorganic acid as hydrochloric acid, hydrobromic acid, sulfuric acid, nitric acid, phosphoric acid, etc., or with such a sulfonic acid as methanesulfonic acid, benzenesulfonic acid, toluenesulfonic acid, etc. These salts are also non-toxic and are more neutral and more soluble in water than the corresponding pyrimidinylguanazole bases, so that these salts may conveniently be used as medicines for the same purpose as the bases, especially favorably as injections.

This invention will now be described in further particularity by means of the following examples. It will be understood, of course, that the invention is not limited to the particular embodiments. In these examples, temperatures are all uncorrected, and the relationship between part by weight and part by volume is the same as that between gram and milliliter.

*Example 1*

Into 100 parts by weight of pyridine were added 29 parts by weight of 2-hydrazinopyrimidine hydrochloride and 22 parts by weight of dicyandiamide, and the mixture was boiled for 5 hours to cause the reaction to take place. After cooling, resulting precipitates were collected and recrystallized from water to obtain 13.8 parts by weight of 1-[pyrimidinyl-(2)]guanazole as pillar crystals which melt at 244–245° C.

*Example 2*

Into 50 parts by weight of pyridine were added 11.4 parts by weight of 2-hydrazino-4,6-dimethylpyrimidine hydrochloride and 55 parts by weight of dicyandiamide, and the mixture was boiled for 30 minutes to cause reaction to take place. After cooling, resulting precipitate were collected and recrystallized from water to obtain 5.4 parts by weight of 1-[4,6-dimethylpyrimidinyl-(2)]-guanazole as plate crystals which decompose at 297° C.

*Example 3*

Into 50 parts by weight of pyridine were added 6.4 parts by weight of 2-hydrazino-4-methylpyrimidine hydrochloride and 3.38 parts by weight of dicyandiamide, and the mixture was boiled for 5 hours to cause reaction to take place. The resultant mixture was concentrated under reduced pressure to remove pyridine, and the residue was recrystallized from diluted ethyl alcohol to obtain 2.7 parts by weight of 1-[4-methylpyrimidinyl-(2)]guanazole which melts at 255° C.

*Example 4*

7 parts by weight of 2-hydrazine-5-bromopyrimidine were dissolved in hydrochloric acid, and the solution was concentrated to dryness to give the corresponding hydrochloride. The so-obtained hydrochloride and 3.1 parts by weight of dicyandiamide were added to 70 parts by weight of pyridine, and the mixture was boiled for 5.5 hours, and then concentrated under reduced pressure. The residue was treated with diluted ethyl alcohol to precipitate crystals of 1-[5-bromopyrimidinyl-(2)]guanazole. The crystals were collected by filtration and recrystallized from diluted ethyl alcohol to obtain 4.9 parts by weight of colorless crystals melting at a temperature higher than 300° C.

2-hydrazino-5-bromopyrimidine employed in this example is a hitherto unknown compound and forms colorless needles melting at 205–206° C., and is synthesized, for example, as follows:

2-amino-5-bromopyrimidine is nitrified with nitric acid in concentrated sulfuric acid to obtain 2-nitroamino-5-bromopyrimidine, which is a novel compound forming plate crystals melting at 189° C., and the product thus obtained is then allowed, as the intermediate compound in the synthesis, to react with hydrazine hydrate under heating to obtain the 2-hydrazino compound.

*Example 5*

Hydrochloric acid was added to 7.3 parts by weight of 2-hydrazino-5-chloropyrimidine, and the solution was concentrated to dryness to obtain the corresponding hydrochloride. Into 70 parts by weight of pyridine were added the above-obtained hydrochloride and 4.2 parts by weight of dicyandiamide, and the mixture was boiled for 5 hours. The resultant mixture was concentrated and the concentrate was cooled to precipitate the crystals of 1-[5-chloropyrimidinyl-(2)]guanazole. The crystals were collected by filtration and recrystallized from diluted ethyl alcohol to obtain 4.1 parts by weight of colorless crystals melting at a temperature higher than 280° C.

2-hydrazino-5-chloropyrimidine employed in this example is a novel compound having been first synthesized by the present inventors and forms colorless needles melting at 180.5–182° C., and is synthesized, for example, as follows:

2-amino-5-chloropyrimidine is nitrified with nitric acid in concentrated sulfuric acid to give 2-nitroamino-5-chloropyrimidine which is also novel and forms colorless plates melting at 173° C. with decomposition. This compound is then allowed to react with hydrazine hydrate to obtain the 2-hydrazino compound.

*Example 6*

Into 20 parts by volume of water were added 4 parts by weight of 2-chloro-4-methylpyrimidine, 3.4 parts by weight of guanazole and 1.65 parts by weight of anhydrous sodium carbonate, and the mixture was boiled for 8 hours to cause reaction to take place. After cooling, resulting precipitates were collected and recrystallized from ethyl alcohol to obtain 1.7 parts by weight of 1-

[4-methylpyrimidinyl-(2)]guanazole as irregular prismatic crystals which melt at 252–253° C.

Instead of 1.65 parts by weight of anhydrous sodium carbonate used in this example, 2.62 parts by weight of sodium hydrogen carbonate or 2.15 parts by weight of potassium carbonate was employed to give a similar result.

Example 7

Into 20 parts by volume of water were added 4 parts by weight of 2-chloropyrimidine, 3.8 parts by weight of guanazole and 1.9 parts by weight of anhydrous sodium carbonate, and the mixture was boiled for 10 hours to cause reaction to take place. The resultant mixture was concentrated under reduced pressure to dryness, and the residue was extracted with 100 parts by volume of hot ethyl alcohol. The ethyl alcohol solution was concentrated to dryness, and the residue was recrystallized from water to obtain 1.5 parts by weight of 1-[pyrimidinyl-(2)]guanazole as pillar crystals which melt at 244–245° C.

Example 8

Into 20 parts by volume of water were added 4 parts by weight of 2-chloro-4,6-dimethylpyrimidine, 2.8 parts by weight of guanazole and 1.5 parts by weight of anhydrous sodium carbonate, and the mixture was boiled for 8 hours to cause reaction to take place. After cooling, precipitates were collected and recrystallized from water to obtain 1.2 parts by weight of 1-[4,6-dimethylpyrimidinyl(2)-]guanazole as plates which decompose at 297–298° C.

Example 9

Into 20 parts by volume of water were added 4 parts by weight of 2-chloro-4,6-dimethylpyrimidine, 2.8 parts by weight of guanazole and 0.5 part by volume of 35%-hydrochloric acid, and the mixture was boiled for 3 hours to cause reaction to take place. The mixture was neutralized with sodium hydrogen carbonate, concentrated, and cooled to give precipitates. The precipitates were recrystallized from water to obtain 1-[4,6-dimethylpyrimidinyl-(2)]guanazole as plate crystals which decompose at 297° C.

In this example, a similar result was obtained by boiling the reaction mixture for 15 hours in the absence of the 35% hydrochloric acid.

Example 10

To 20 parts by weight of concentrated hydrochloric acid was added 10 parts by weight of nitric acid salt of 1-guanylguanazole and into the mixture was gradually dropped 2.5 parts by weight of propargyl aldehyde under cooling and agitation. After completing the addition, agitation was further continued for several hours, and the mixture was allowed to stand overnight and then concentrated at a low temperature. The residue was supplied with water and neutralized with sodium carbonate to separate crystals. The crystals were collected and recrystallized from water to obtain 3.8 parts by weight of 1-[pyrimidinyl-(2)]guanazole as colorless pillars melting at 244–245° C.

Example 11

To 80 parts by volume of ethyl alcohol saturated with hydrogen chloride was added 10 parts by weight of hydrochloric acid salt of 1-guanylguanazole, and 12.5 parts by weight of 1,1,3,3-tetraethoxypropane was gradually dropped into the ethyl alcohol mixture with agitation under ice-cooling. After completing the addition, the agitation was continued for further several hours at a room temperature. The mixture was allowed to stand overnight and then concentrated at a low temperature. The residue was supplied with water and neutralized with sodium carbonate to become weakly acid, whereupon crystals precipitated. The crystals were recrystallized from water to obtain 3 parts by weight of 1-[pyrimidinyl-(2)]guanazole as colorless pillars melting at 214–245° C.

Example 12

Into 100 parts by volume of ethyl alcohol containing a little amount of hydrochloric acid were added 10 parts by weight of hydrochloric acid salt of 1-guanylguanazole and 5 parts by weight of acetylacetone. The mixture was stirred for several hours at a room temperature, and then warmed at a temperature of about 50° C. for 10 hours. The reaction mixture was concentrated, and the residue was supplied with water and then neutralized to separate out precipitates of 1-[4,6-dimethylpyrimidinyl-(2)]guanazole, which were collected by filtration. The product forms colorless plates decomposing at 297° C. The yield, 2.2 parts by weight.

Example 13

Into 30 parts by volume of a mixture of equal amounts of water and ethyleneglycol monoethylether were added 5.6 parts by weight of 2-chloro-4-methyl-6-methoxypyrimidine and 3.5 parts by weight of guanazole, and the mixture was boiled for 7 hours to cause reaction to take place. The reaction mixture was concentrated to dryness and the residue was dissolved in a little amount of water. The solution was rendered alkaline by the addition of an aqueous solution of sodium hydroxide to separate out crystals. The crystals were recrystallized from diluted ethyl alcohol to obtain 1.2 parts by weight of 1-[4-methyl-6-methoxypyrimidinyl-(2)]guanazole as colorless needles melting at 252–254° C.

Example 14

Into 30 parts by weight of pyridine were added 2.06 parts by weight of 2-hydrazino-4-methylpyrimidine hydrochloride and 2 parts by weight of N-cyano-N'-phenylguanidine, and the mixture was boiled for 4 hours to cause reaction to take place. After cooling, separated crystals were collected by filtration and recrystallized from diluted ethyl alcohol to obtain 0.9 part by weight of 1-[4-methylpyrimidinyl-(2)]-3-amino-5-anilino-(1,2,4)-triazole as fine crystals melting at 248–249° C.

Example 15

To 15 parts by volume of acetic acid anhydride was added 2 parts by weight of 1-[pyrimidinyl-(2)]guanazole, and the mixture was boiled for 10 minutes. The reaction mixture was ice-cooled, and insoluble crystals collected by filtration were recrystallized from water to obtain 1.2 parts by weight of 1-[pyrimidinyl-(2)]-3-acetamido-5-amino-(1,2,4)-triazole as pillar crystals melting at a temperature higher than 300° C.

Example 16

A mixture of 1 part by weight of 1-[pyrimidinyl-(2)]-guanazole and 1.5 parts by weight of succinic acid was heated for 5 minutes on a bath of 180–185° C. Then, to the reaction mixture was added 20 parts by volume of water and the mixture was boiled for a while, and then cooled. Insoluble substances were collected by filtration to obtain 1.6 parts by weight of 1-[pyrimidinyl-(2)]-3-succinylamino-5-amino-(1,2,4)-triazole monohydrate, which was recrystallized from water to give colorless needles melting at 250–252° C.

Having thus disclosed the invention, we claim:

1. A compound of the formula, wherein each of $R^1$ and $R^3$ is a member selected from the group consisting of hydrogen, lower alkyl and lower alkoxyl, $R^2$ is a member selected from the group consisting of hydrogen, halogen, lower alkyl and lower alkoxy, and each of $R^4$ and $R^5$ is a member selected from the group consisting of hydrogen, lower alkyl, acetyl, succinyl, phenyl, p-loweralkoxyphenyl, o-methoxyphenyl and p-halophenyl.

2. 1[pyrimidinyl-(2)]guanazole.
3. 1-[4-methylpyrimidinyl-(2)]guanazole.
4. 1-[4,6-dimethylpyrimidinyl-(2)]guanazole.
5. 1-[5-chloropyrimidinyl-(2)]guanazole.
6. 1-[5-bromopyrimidinyl-(2)]guanazole.
7. 1-[4-methyl-6-methoxypyrimidinyl-(2)]guanazole.
8. 1-[4 - methylpyrimidinyl - (2)] - 3 - amino-5-anilino-(1,2,4)-triazole.
9. 1 - [pyrimidinyl - (2)] - 3 - acetamino - 5 - amino-(1,2,4)triazole.
10. 1 - [pyrimidinyl - (2)] - 3 - succinylamino - 5-amino-(1,2,4)-triazole.

References Cited in the file of this patent
UNITED STATES PATENTS
2,295,566     D'Alelio et al. _____ Sept. 15, 1942

UNITED STATES PATENT OFFICE
CERTIFICATE OF CORRECTION

Patent No. 3,041,339                          June 26, 1962

Kenzo Sirakawa et al.

It is hereby certified that error appears in the above numbered patent requiring correction and that the said Letters Patent should read as corrected below.

Column 1, lines 17 to 22, the left-hand portion of the formula should appear as shown below instead of as in the patent:

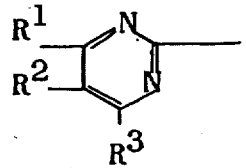

column 4, lines 2 and 3, for "benezenesulfonic" read -- benzenesulfonic --.

Signed and sealed this 27th day of November 1962.

SEAL)

ttest:

;TON G. JOHNSON ttesting Officer

DAVID L. LADD
Commissioner of Patents